United States Patent Office 2,815,346
Patented Dec. 3, 1957

2,815,346

NOVEL 6-CHLOROPURINE COMPOUNDS AND METHOD OF PREPARING THEM

George H. Hitchings, Tuckahoe, and Gertrude B. Elion, Bronxville, N. Y., assignors to Burroughs Wellcome & Co. (U. S. A.) Inc., Tuckahoe, N. Y., a corporation of New York No Drawing. Application May 25, 1955,
Serial No. 511,127

5 Claims. (Cl. 260—254)

This invention relates to certain novel 6-chloropurines and a method for the preparation of 6-chloropurines of the class represented by the following formula:

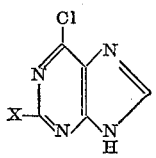

wherein X is selected from the class consisting of hydrogen, amino, hydroxyl, aryl and alkyl radicals. These chloropurines are of interest as inhibitors of L. Casei, as well as other micro-organisms, and as pharmaceutical intermediates. They are particularly useful in the preparation of certain purines hitherto not readily obtainable. These encompass substituted amino, thiocyano, iodo and fluoro purines, and where X is a relatively inert group, such as alkyl, aryl and hydrogen, a wide variety of substituents as derived through organo metal intermediates including cyano, carboxyl, alkyl and aryl groupings having growth-inhibiting and antileukemic value.

Heretofore a few chloropurines have been avialable through treatment of the corresponding hydroxypurines with reagents such as phosphoryl chloride and phosphorus penta and trichlorides. These methods generally have not been very productive, and have failed completely with starting materials such as 2-amino-6-hydroxy and 2-methyl-6-hydroxypurines. The new method depends on the discovery that a mercapto group can be smoothly and nearly quantitatively replaced by a chloro group by treatment of the mercapto compound with chlorine under controlled conditions.

The following will serve as illustrations of the teachings of these inventors.

EXAMPLES

6-chloropurine

A stream of chlorine gas was passed through a suspension of 2 g. of 6-mercaptopurine hydrate in 25 ml. of absolute ethanol. The temperature was maintained below 35° by immersion of the reaction flask in an ice bath and intermittent stopping of the chlorine stream. When there was no further temperature change upon the introduction of chlorine, the precipitate was filtered, washed with absolute ethanol, and dried in the air. The 6-chloropurine hydrochloride had the following ultraviolet absorption spectrum:

at pH = 1   $\lambda$ max = 265 m$\mu$
at pH = 11  $\lambda$ max = 275 m$\mu$

2-amino-6-chloropurine

A suspension of 2.1 g. of 2-amino-6-mercaptopurine in 100 ml. of absolute ethanol was cooled in an ice bath and subjected to a stream of chlorine gas intermittently over a period of one and one-half hours so that the temperature did not rise above 30°. When there was no further increase in temperature, the stream of chlorine was discontinued, a small insoluble residue was removed and the alcoholic filtrate was taken to dryness at 30° under reduced pressure. The syrupy residue was suspended in 200 ml. of 25% aqueous ethanol, adjusted to pH 5 by the addition of 2 N sodium hydroxide, and chilled. The precipitate consisted of 2-amino-6-chloropurine with the following ultraviolet absorption spectrum:

at pH = 1   $\lambda$ max = 295 m$\mu$
at pH = 11  $\lambda$ max = 292 m$\mu$

It could be converted to 2-amino-6-mercaptopurine by treatment with ammonium polysulfide.

What we claim is:

1. A method of preparing purine compounds selected from the class consisting of 6-chloropurine and 2-amino-6-chloropurine which comprises treating the corresponding 6-mercaptopurine with elemental chlorine at a temperature not substantially in excess of 35°.

2. The method set forth in claim 1 wherein a stream of chlorine gas is passed through a suspension of 6-mercaptopurine hydrate in absolute ethyl alcohol.

3. The method set forth in claim 2 wherein the temperature was maintained below 35°.

4. A method of preparing 6-chloropurine which comprises treating 6-mercaptopurine with elemental chlorine at a temperature not substantially in excess of 35°.

5. A method of preparing 2-amino-6-chloropurine which comprises treating 2-amino-6-mercaptopurine with elemental chlorine at a temperature not substantially in excess of 35°.

References Cited in the file of this patent

Biltz et al.: J. Prakt. Chem. 118, 149–165 (1928).